United States Patent
Batke et al.

(10) Patent No.: US 8,028,099 B2
(45) Date of Patent: Sep. 27, 2011

(54) INDUSTRIAL CONTROL SYSTEM WITH WEB ENABLED I/O MODULES

(75) Inventors: Brian A. Batke, Novelty, OH (US); Gary W. Baczkowski, Seven Hills, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 2084 days.

(21) Appl. No.: 09/967,724

(22) Filed: Sep. 28, 2001

(65) Prior Publication Data

US 2002/0156868 A1   Oct. 24, 2002

Related U.S. Application Data

(60) Provisional application No. 60/285,291, filed on Apr. 20, 2001.

(51) Int. Cl.
*G06F 15/16* (2006.01)
(52) U.S. Cl. ......................... 709/250; 709/230
(58) Field of Classification Search .......... 709/220–223, 709/230, 250
See application file for complete search history.

(56) References Cited

U.S. PATENT DOCUMENTS

| | | | |
|---|---|---|---|
| 5,131,092 A | 7/1992 | Sackmann et al. | |
| 5,621,672 A * | 4/1997 | Kobayashi et al. | 700/5 |
| 5,805,442 A | 9/1998 | Crater et al. | |
| 5,975,737 A | 11/1999 | Crater et al. | |
| 5,982,362 A | 11/1999 | Crater et al. | |
| 6,061,603 A | 5/2000 | Papadopoulos et al. | |
| 6,151,625 A | 11/2000 | Swales et al. | |
| 6,199,074 B1 * | 3/2001 | Kern et al. | 707/204 |
| 6,282,454 B1 * | 8/2001 | Papadopoulos et al. | 700/83 |
| 6,321,272 B1 * | 11/2001 | Swales | 709/250 |
| 6,640,140 B1 * | 10/2003 | Lindner et al. | 700/18 |
| 6,690,981 B1 * | 2/2004 | Kawachi et al. | 700/83 |
| 6,715,139 B1 * | 3/2004 | Kodosky et al. | 717/125 |
| 6,732,191 B1 * | 5/2004 | Baker et al. | 710/1 |
| 2001/0003804 A1 | 6/2001 | Papadopoulos et al. | |
| 2001/0014833 A1 | 8/2001 | Brault | |

FOREIGN PATENT DOCUMENTS

WO    WO 99/13418 A1    3/1999

OTHER PUBLICATIONS

Webster's II New Riverside University Dictionary 636 (1994).*

* cited by examiner

*Primary Examiner* — John Follansbee
*Assistant Examiner* — Glenford Madamba
(74) *Attorney, Agent, or Firm* — Boyle Fredrickson LLP; R. Scott Speroff; John M. Miller

(57) ABSTRACT

An industrial control system provides a programmable logic controller communicating with I/O modules which provide an electrical interface to controlled equipment and which support web servers for communication of I/O data directly with the Internet. The programmable logic controller communicates with the I/O modules over a control-network which may be separate from or shared with the Internet communications. A lock-out system prevents collisions between web clients writing to I/O and allows the programmable logic controller to limit web access to critical I/O points.

14 Claims, 2 Drawing Sheets

INDUSTRIAL CONTROL SYSTEM WITH WEB ENABLED I/O MODULES

CROSS-REFERENCE TO RELATED APPLICATIONS

This application claims the benefit of U.S. provisional patent application No. 60/285,291, filed on Apr. 20, 2001.

STATEMENT REGARDING FEDERALLY SPONSORED RESEARCH OR DEVELOPMENT

BACKGROUND OF THE INVENTION

The present invention relates to industrial control systems used for real-time control of industrial processes, and in particular to a programmable logic controller with input/output (I/O) modules that can communicate directly with the World Wide Web.

Industrial control systems are special purpose computer systems used in controlling industrial processes. Under the direction of a stored control program, a programmable logic controller, being part of the industrial control system, reads inputs from a series of input modules and writes outputs to a series of output modules. The input modules read signals from sensors associated with the industrial process and the output modules provide signals to actuators and the like in the industrial process. The inputs and outputs may be binary, that is on or off or analog, providing a value with a continuous range or more complex I/O devices like motor controllers and the like.

Industrial control systems differ from conventional computer systems in that they provide highly reliable operation and deterministic real-time control. In part, this requires both that data communicated between the programmable logic controller and the input and output modules be transmitted in a predictable sequence. This may be provided by use of an I/O image table which is populated with complete sets of input or output data before control decisions are made and before outputs are forwarded to the I/O modules.

Often it is desired to monitor an industrial process remotely. The development of the Internet and the Web has raised the possibility of using Web servers and browsers to implement a remote human/machine interface that could be used on any browser enabled computer. Current proposals for providing Web access to an industrial control system envision a Web server module that may plug into a common backplane to communicate with the programmable logic controller. Input and output data is communicated between the I/O module and the programmable logic controller and selectively communicated, under the control of the programmable logic controller, between the programmable logic controller and the Web server module.

Such a Web server module may be inappropriately expensive for simple control applications, particularly with regard to the necessary reprogramming of the control program executed by the programmable logic controller to coordinate communication with the Web server module. This coordination process can significantly add to the processing burden of the programmable logic controller.

BRIEF SUMMARY OF THE INVENTION

The present invention provides I/O modules each having integral Web servers that may communicate directly with the Web without the intervention of the programmable logic controller. Web access can thus be provided, efficiently, for even a few I/O points. In addition, extremely rapid Web access is possible by working directly with the I/O data rather than indirectly with I/O data as stored in the I/O image table normally supervised by the programmable logic controller.

As an additional benefit, access to the I/O data can be obtained before the programmable logic controller is operational for troubleshooting and set-up of the industrial process, or in the event of failure of the programmable logic controller.

Potential conflicts between these two sources of direct communication with I/O (the programmable logic controller and the Web-based HMI) are avoided by a write disable command that may be sent to the Web server interface of the I/O modules from the programmable logic controller, after the latter is enabled, to selectively prevent output data from coming from the Web.

Specifically, then, the present invention provides an I/O module for use with an industrial control system having a programmable logic controller executing an industrial control program and communicating over a control-network with the I/O module. The I/O module includes: an I/O interface communicating electrical signals between the I/O interface and an industrial process; an Internet interface communicating electrical signals between the Internet interface and the Internet; and a network interface communicating electrical signals between the network interface and the control-network. A processing unit connected to the I/O interface, the Internet interface and the network interface and executing a stored program, passes data both between the Internet and the I/O interface and between the network interface and the I/O interface.

It is thus one object of the invention to permit Internet based communication with the industrial process directly through the I/O module without intervention of the programmable logic controller.

The programmable logic controller may include an Internet/control-network bridge and the network interface and the Internet interface may both include a media connection to the control-network and the Internet interface may communicate with the Internet by way of the control-network and the bridge. The control-network may, but need not be, an Ethernet network.

Thus it is another object of the invention to permit direct Internet communication with I/O modules without the need for multiple network media. An Ethernet network, like other networks, can support control protocols and TCP/IP needed for Web communication.

Alternatively, the Internet interface may include a connector for attaching the Internet interface directly to a communications medium other than the control-network.

Thus it is another object of the invention to permit direct Web to I/O communication in systems where Web messages are not easily or economically handled by the control-network.

The processing unit of the I/O module may also execute its stored program to accept a write disable command from the programmable logic controller causing the stored program to controllably block data from passing between the Internet interface and the I/O interface.

Thus it is another object of the invention to allow communication between the I/O modules and both the Web and the programmable logic controller without conflicts. The programmable logic controller once on line, can block Web access to critical outputs or the like.

The I/O module may be used in conjunction with an Internet filter module positioned between the I/O module and the Internet. The Internet filter module may have a processing unit executing a stored program to accept a write disable command from the programmable logic controller causing the stored program to controllably block data from passing between the Internet and the I/O interface. The Internet filter may be shared with multiple Internet interfaces for multiple I/O modules and the write disable command from the programmable logic controller may cause the stored program to controllably block data from passing between the Internet and the specific ones of I/O interfaces including the I/O interface.

Thus it is another object of the invention to permit a centralized blocking of Web access to Internet ready I/O modules.

The I/O interface may communicate with multiple independent I/O points and the processor of the Internet filter module may further execute the stored program to accept a write disable command from the programmable logic controller causing the stored program to controllably block data from passing between the Internet and the I/O interface with respect to selected I/O points.

Thus it is another object of the invention to permit selective blocking of Internet control of the I/O points, for example, to allow reading but not writing of I/O points.

The foregoing objects and advantages may not apply to all embodiments of the inventions and are not intended to define the scope of the invention for which purpose claims are provided. In the following description, reference is made to the accompanying drawings, which form a part hereof, and in which there is shown by way of illustration, a preferred embodiment of the invention. Such embodiment also does not define the scope of the invention and reference must be made therefore to the claims for this purpose.

DETAILED DESCRIPTION OF THE PREFERRED EMBODIMENT

Figure 1:
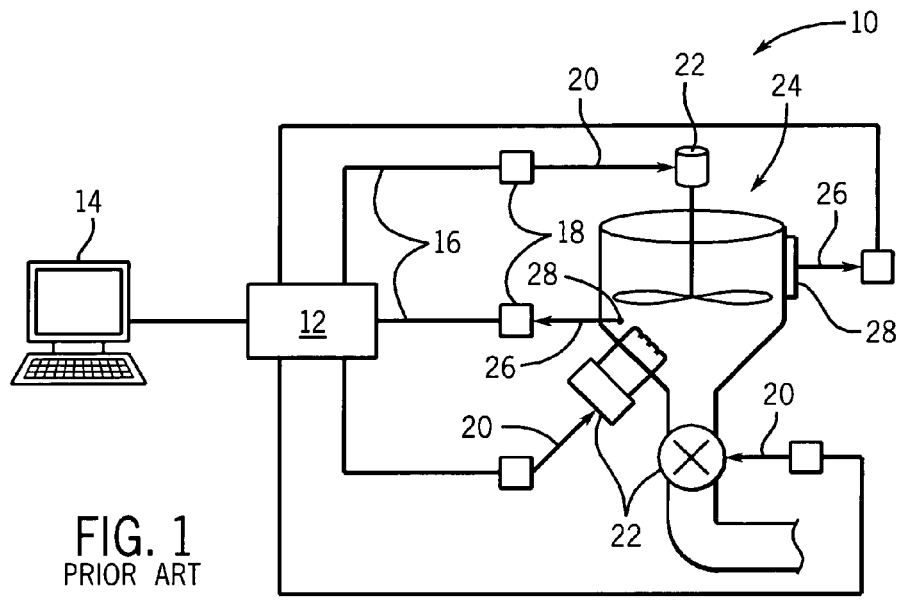
FIG. 1 is a simplified block diagram of a prior art control system showing the relationship between a programmable logic controller and various I/O modules communicating with an industrial process.

Referring now to FIG. 1, a conventional industrial control system 10 provides a programmable logic controller 12 connected to interface terminal 14. The interface terminal 14 may be a standard desktop computer and is used to develop programs for the programmable logic controller and to provide interface for monitoring its operation.

The programmable logic controller 12 also includes a network interface (not shown) to communicate over a control-network 16 with one or more I/O modules 18. The I/O modules may be in the same housing as the programmable logic controller 12 in which case the control-network is a portion of a backplane (not shown) or may be remote from the programmable logic controller 12.

The I/O modules 18 provide an interface between the control-network 16 and output electrical signals 20 that may be written to actuators 22 of the controlled process 24. The I/O modules 18 also receive input electrical signals 26 from sensors 28 of the control process 24. Generally as is understood in the art, the programmable logic controller reads input electrical signals 26 from sensors 28 via input I/O modules 18 and based on those input signals, and the logic of the control program in the programmable logic controller 12, provides output signals to other I/O modules 18 which become output electrical signals 20 to actuators 22.

Figure 2:
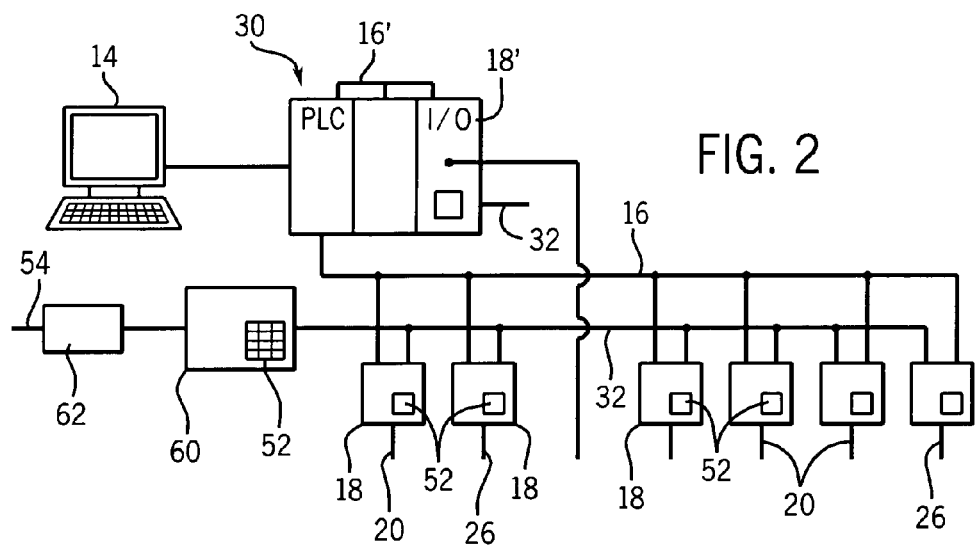
FIG. 2 is a schematic representation of a first embodiment of the present invention in which a programmable logic controller communicates over a control-network with internal or external I/O modules each of which may support a web server communicating over a second network with the Internet and showing the use of an optional in-line Internet filter to prevent conflicting I/O commands.

Referring now to FIG. 2, I/O modules 18, remote from the programmable logic controller 12, communicate over a high speed serial control-network 16, and I/O modules 18', contained within a rack 30 holding the programmable logic controller, communicate via a backplane portion of the control network 16'. In the embodiment of FIG. 2, each of the I/O modules 18 and 18' provide a connection to a second Internet-network 32 such as may support the TCP/IP protocol used by the Internet. The Internet network 32 may be, for example, conductive metal cable, a radio link, an infrared link, or an optical fiber and connects in a daisy chain fashion among the I/O modules 18 and 18', however, other connection topologies well known in the art may be used. The control network 16 can be, instead of a high speed serial network, any of a variety of other types of networks known in the art (e.g., a parallel network rather than a serial network).

Figures 4, 5, 6:
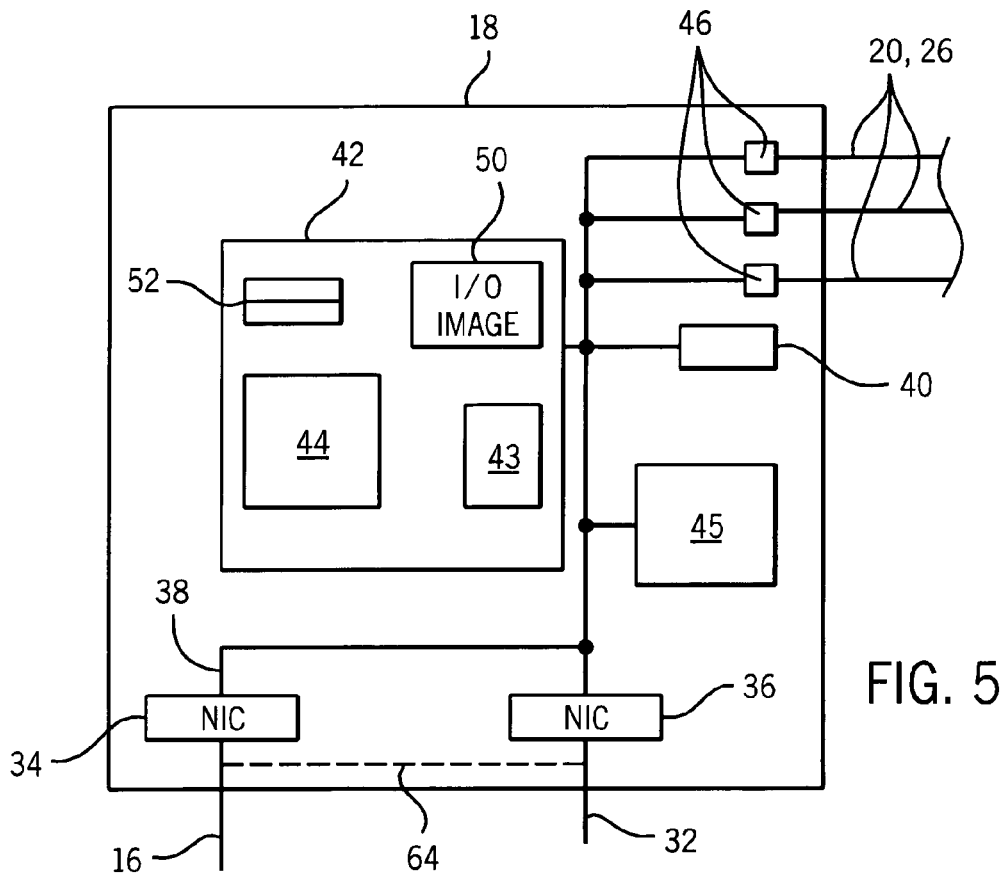
FIG. 4 is a symbolic representation of a write token/lockout flag table used for a simple I/O module to facilitate combined web and programmable logic control access.
FIG. 5 is a schematic block diagram of an I/O module according to the present invention showing the multiple network interfaces which may communicate with one or different media and showing a processor and embedded web server suitable for one embodiment of the invention.
FIG. 6 is a symbolic representation of a filter table suitable for the optional in-line Internet filter of FIG. 2 in controlling access to various I/O points.

Referring now momentarily to FIG. 5, the I/O modules 18 and 18' each incorporate two communications interfaces 34 and 36. The first communication interface is network interface 34 communicating with the control-network 16. As is known in the art, the network interface 16 may provide a media access layer implemented in hardware together with firmware executing appropriate, higher level protocols for the control-network 16. The second communication interface is Internet interface 36 for communicating with the Internet 54 either directly or through an access device 62 such as a modem. The Internet interface 36 provides for a media access layer typically implemented in hardware and the higher-level protocols, for example TCP/IP, necessary for Internet communication. Alternatively for both communication interfaces 34 and 36, higher-level protocols may be implemented by one or more processors within the I/O module 18. Also, in alternate embodiments, only one communications interface for communication with one or both of the control network and Internet is used. Further, the Internet 54 and the Internet interface 36 are intended to broadly cover any communications system and interface for communicating with such communication system that operate by way of the same or similar protocols and formats as the World Wide Web including, for example, an intranet.

Both communication interfaces 34 and 36 also communicate over an internal bus 38 with a processor 40 and a memory 42 the latter implemented typically as a combination of volatile and nonvolatile solid state memory devices. The memory 42 holds the operating program 43 for the I/O module such as may handle the logic implemented by the I/O module. The memory 42 may also hold a web server program and one or more web pages or applets to be served. Web server programs may be obtained from such open source suppliers as the Apache Foundation. Alternatively, the web server function and the served content may be handled by an embedded web server 45 being a processor and software combination of a type known in the art, also connected to the internal bus 38.

The processor 40 executing the operating program 43 handles communication between the programmable logic controller 12 and the I/O module 18 according to prior art techniques to read and write from and to I/O interfaces 46 which serve to provide electrical interface between the internal bus 38 and output and input electrical signals 20 or 26 as have been described above. In this regard, memory 42 may also include a local I/O image table 50 storing the values of the input electrical signals 26 prior to transfer over the industrial control-network 16 or the Internet 32 and input electrical signals 20 prior to transfer to the industrial process 24. Generally, the I/O image table 50 serves as an intermediary to all data transfer between the programmable logic controller 12 and the controlled process 24.

In addition, the memory 42 provides for a write token/lockout flag table 52 providing control of access to the I/O image table 50 according to the source of the read or write signals from a specific one of the network interface 34 or Internet interface 36. Referring to FIG. 4, the write token/lockout flag table 52 in its simplest form includes a write token 56 being a flag whose state moderates control of the writing to the I/O image table 50 and in this way controls which of multiple competing clients communicating over the Internet may, for example, write an output electrical signal 20. According to one procedure, a particular Internet client must obtain the write token (e.g. by resetting a bit in the write token 56) prior to making a write to the I/O table 50. This obtaining of the token requires the client to read the flag if it is set, to take possession of the token by resetting the flag. If the flag is already reset, the client must wait until the bit is set again prior to attempting to reset it. A successful resetting of the flag, thus taking possession of the token, allows that client to write an output electrical signal 20 and blocks other clients from simultaneously affecting these outputs to possibly undesirable consequences.

The write token/lockout flag table 52 also includes a lockout 58 that may only be set by a command received over the control-network 16 from the programmable logic controller 12. The purpose of the lockout 58 is to prevent critical outputs of the controlled process 24 from being changed by other than the programmable logic controller 12 once the programmable logic controller 12 has been fully programmed and is running. This lockout 58 provides for a high level of integrity of outputs necessary in the industrial control environment on control of its setting and resetting and the blocking of the writing to outputs of the controlled process is performed by the operating program 43.

It is anticipated that the write token/lockout flag table 52 may incorporate multiple flags depending on the type of I/O module 18 and the number of input and output signals 20 and 26 handled by the I/O module 18. In this way, different individual output signals 20 may be written to by different clients writing from the Internet. Further the programmable logic controller may lockout certain outputs and leave others unlocked.

Figure 3:
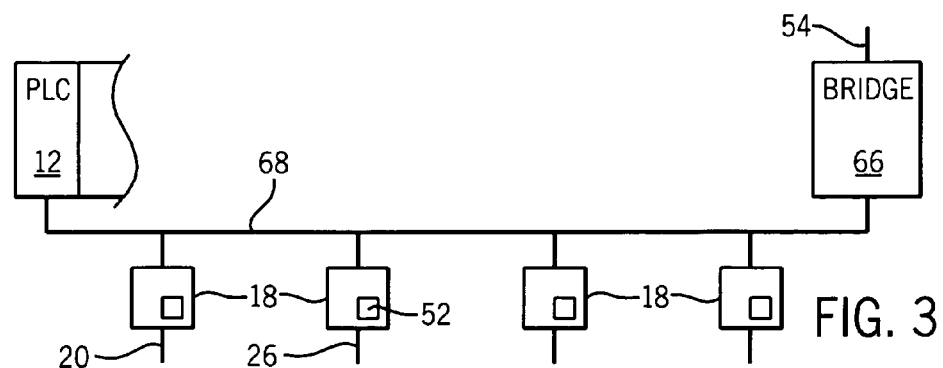
FIG. 3 is a figure similar to that of FIG. 2 showing an alternative embodiment in which a single network supports both communications between the programmable logic controller and the I/O modules and communication between the Internet and the I/O modules.

Referring now to FIGS. 2 and 3, in an alternative embodiment, the write token and/or lockout 58 may be implemented by a filter 60 shared by a number of I/O modules 18. The filter 60 is positioned so that signals between the Internet 32 and the I/O modules 18 must pass prior through it. The filter 60 executes an internal program to monitor all read or write commands to I/O modules 18 and to block those that have been locked out by the programmable logic controller 12 according to an write token and/or lockout 58. The filter also implements write tokens 56 that may be queried by Internet clients.

Thus for example, referring to FIG. 6, a write token/lockout flag table 52 implementing write tokens 56 may provide for a set of write tokens having one bit for each output implemented by a particular I/O module 18 that may be set or reset. The client programs may seek the write token 56 in the filter 60 rather than in the particular I/O modules 18 simply by convention. A similar structure (not shown) may be used to implement lockouts for the various I/O modules. In this case, however, the filter may operate to block messages according to whether the particular lockout bit is set or reset within its structure.

Referring now to FIGS. 3 and 5, in an alternative embodiment, the two network interfaces 34 and 36 may share common media through jumper 64 thereby imposing the possibly two different high level protocols of the control-network 16 and the Internet 32 on common combination media 68. In this case, the programmable logic controller 12 monitors the combination media 68 to extract messages that have the protocol of the control-network 16 and a bridge device 66 monitors the combination media 68 to extract messages that have the protocol of the Internet 54. The low level protocol of the common media 68 may be an Ethernet protocol to provide the functionality of both a control-network executing higher level control net protocols and TCP/IP used on the Internet.

It is specifically intended that the present invention not be limited to the embodiments and illustrations contained herein, but that modified forms of those embodiments including portions of the embodiments and combinations of elements of different embodiments also be included as come within the scope of the following claims.

We claim:

1. An I/O module for use with an industrial control system having a programmable logic controller for executing an industrial control program and communicating over a control-network with the I/O module, the I/O module comprising:

an I/O interface communicating electrical signals between the I/O interface and the industrial process;
an Internet interface communicating electrical signals between an embedded Web server and the Internet;
a network interface communicating electrical signals between the I/O module and the programmable logic controller; and
a processing unit connected to the I/O interface, the Internet interface and the network interface and executing a stored program to pass data both between the Internet and the I/O interface and between the network interface and the I/O interface;
wherein both the network interface and the Internet interface include a media connection to common media of the control-network and wherein the Internet interface communicates with the Internet through the control-network and the network interface communicates with the programmable logic controller through the control-network;
whereby Internet control of the industrial process may be had through the I/O module using the embedded Web server without intervention of the programmable logic controller;
wherein the processing unit also executes the stored program to accept a write disable command from the programmable logic controller causing the stored program to controllably block data from passing between the Internet interface and the I/O interface.

2. The I/O module of claim 1 wherein the control-network is an Ethernet network.

3. The I/O module of claim 1 wherein the control-network provides a communication medium is selected from the group consisting of: a conductive metal cable, a radio link, an infrared link, and an optical fiber.

4. The I/O module of claim 1 wherein the control-network is selected from the group consisting of ControlNet, DeviceNet, and Ethernet.

5. The I/O module of claim 1 including further an Internet filter module positioned between the I/O module and the Internet, the Internet filter module having a processing unit executing a stored program to accept a write disable command from the programmable logic controller causing the stored program to controllably block data from passing between the Internet and the I/O interface.

6. The I/O module of claim 5 wherein the I/O interface communicates with multiple independent I/O points and wherein the processor of the Internet filter module further executes the stored program to accept a write disable command from the programmable logic controller causing the stored program to controllably block data from passing between the Internet and the I/O interface with respect to selected I/O points.

7. An industrial control system comprising:
a control-network;
a programmable logic controller for executing an industrial control program and having an interface for communicating on the control-network;
a plurality of I/O modules communicating further including
(a) respective I/O interfaces communicating electrical signals between the I/O interface and the industrial process, at least one I/O module further including;
(b) respective network interfaces communicating electrical signals between the network interface and the control-network;
at least one I/O module further including:
(c) an Internet interface respective Internet interfaces communicating electrical signals between the Internet interface I/O module and the Internet; and
(d) a processing unit which executes a stored program to accept a write disable command from the programmable logic controller causing the stored program to controllably block data from passing between the Internet interface and the I/O interface while allowing data to pass between the I/O interface and the network interface;
whereby Internet control of the industrial process may be had through the I/O module modules without intervention of the programmable logic controller.

8. The industrial control system of claim 7 including further an Internet/control-network bridge having both an Internet connection and a control-network connection and wherein both the network interface and the Internet interface of the I/O module include a connection to the control-network and wherein the Internet interface communicates with the Internet through the control-network to the bridge and through the bridge to the Internet.

9. The industrial control system of claim 8 wherein the control-network is an Ethernet network.

10. The industrial control system of claim 7 wherein the Internet interface includes a media connection for attaching to a communications medium other than the control-network.

11. The industrial control system of claim 10 wherein the communication medium is selected from the group consisting of: a conductive metal cable, a radio link, an infrared link, and an optical fiber.

12. The industrial control system of claim 7 wherein the control-network is selected from the group consisting of ControlNet, DeviceNet, and Ethernet.

13. The industrial control system of claim 7 including further an Internet filter module positioned between the I/O modules and the Internet, the Internet filter module having a processing unit executing a stored program to accept a write disable command from the programmable logic controller causing the stored program to controllably block data from passing between the Internet and the I/O interface.

14. The industrial control system of claim 13 wherein the I/O interface communicates with multiple independent I/O points and wherein the processor of the Internet filter module further executes the stored program to accept a write disable command from the programmable logic controller causing the stored program to controllably block data from passing between the Internet and the I/O interface with respect to selected I/O points.

* * * * *